United States Patent
Lee et al.

(10) Patent No.: US 12,451,171 B2
(45) Date of Patent: Oct. 21, 2025

(54) HIGH-SPEED AND AREA-EFFICIENT PARALLEL-WRITE-AND-READ MEMORY

(71) Applicant: QUALCOMM Incorporated, San Diego, CA (US)

(72) Inventors: Hochul Lee, Los Angeles, CA (US); Anil Chowdary Kota, San Diego, CA (US); Dhvani Sheth, San Diego, CA (US); Bin Liang, San Diego, CA (US); Chulmin Jung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 18/349,918

(22) Filed: Jul. 10, 2023

(65) Prior Publication Data
US 2025/0022494 A1 Jan. 16, 2025

(51) Int. Cl.
*G11C 7/10* (2006.01)
*G11C 7/08* (2006.01)

(52) U.S. Cl.
CPC .............. *G11C 7/1069* (2013.01); *G11C 7/08* (2013.01); *G11C 7/1012* (2013.01); *G11C 7/1096* (2013.01)

(58) Field of Classification Search
CPC ....... G11C 7/1069; G11C 7/08; G11C 7/1012; G11C 7/1096; G11C 7/18; G11C 7/227; G11C 7/1078; G11C 11/419
USPC ................................................... 365/189.011
See application file for complete search history.

(56) References Cited

U.S. PATENT DOCUMENTS

| | | | |
|---|---|---|---|
| 9,077,323 B1* | 7/2015 | Atesoglu | H03K 5/249 |
| 2011/0194333 A1* | 8/2011 | Kim | G11C 11/1673 |
| | | | 365/158 |
| 2013/0111282 A1 | 5/2013 | Clark et al. | |
| 2015/0357030 A1 | 12/2015 | Iyer et al. | |
| 2021/0074365 A1* | 3/2021 | Dinh | G11C 7/1042 |
| 2021/0110867 A1 | 4/2021 | Gupta et al. | |
| 2021/0191624 A1 | 6/2021 | Zawodny et al. | |

(Continued)

OTHER PUBLICATIONS

International Search Report and Written Opinion—PCT/US2024/032450—ISA/EPO—Oct. 15, 2024.

*Primary Examiner* — Huan Hoang
(74) *Attorney, Agent, or Firm* — Loza & Loza LLP (57) ABSTRACT

A memory is provided with a pair of banks including a first bank of bitcells and a second bank of bitcells. An I/O circuit for the pair of banks includes a shared write path configured to couple a write driver input signal to the first bank of bitcells responsive to an assertion of a write enable signal for the first bank of bitcells and to couple the write driver input signal to the second bank of bitcells responsive to an assertion of a write enable signal for the second bank of bitcells. The I/O circuit also includes a shared read path configured to couple a data bit output signal from the first bank of bitcells to a sense amplifier responsive to a de-assertion of the write enable signal for the first bank of bitcells and to couple a data bit output signal from the second bank of bitcells to the sense amplifier responsive to a de-assertion of the write enable signal for the second bank of bitcells. The shared read and write paths are further configured to operate simultaneously so that a write operation to one of the banks may occur while a read operation occurs to another one of the banks.

24 Claims, 5 Drawing Sheets

(56) References Cited

U.S. PATENT DOCUMENTS

2021/0327495 A1 10/2021 Patil et al.
2022/0385291 A1 12/2022 Wang

* cited by examiner

HIGH-SPEED AND AREA-EFFICIENT PARALLEL-WRITE-AND-READ MEMORY

TECHNICAL FIELD

This application relates to integrated circuit memories, and more particularly to an integrated circuit memory with parallel write and read operations.

BACKGROUND

An integrated circuit memory such as a static random-access memory (SRAM) includes bitcells that are arranged into rows and columns. Each row is traversed by a corresponding word line. As the number of bitcells increases, it is efficient to arrange the bitcells into banks such that each bank has its own rows and corresponding word lines. Each bank will typically have its own input/output (I/O) circuit that includes the read and write paths to the bank's bitcells.

SUMMARY

In accordance with an aspect of the disclosure, a memory is provided that includes: a first bank of bitcells arranged into rows and columns; a first bank column multiplexer configured to select a column from the first bank of bitcells; a second bank of bitcells arranged into rows and columns; a second bank column multiplexer configured to select a column from the second bank of bitcells; and an input/output circuit including a shared read path coupled to the first bank column multiplexer and to the second bank column multiplexer and including a shared write path coupled to the first bank column multiplexer and to the second bank column multiplexer.

In accordance with another aspect of the disclosure, a method of operation for a memory is provided that includes: coupling a first data input signal through a shared write path to form a first write driver input signal at a first data input terminal shared by a first bank column multiplexer for a first bank of bitcells and shared by a second bank column multiplexer for a second bank of bitcells; coupling the first write driver input signal through the first bank column multiplexer to write to the first bank of bitcells during a first write operation responsive to an assertion of a write enable signal for the first bank of bitcells; coupling a second data input signal through the shared write path to form a second write driver input signal at the first data input terminal; and coupling the second write driver input signal through the second bank column multiplexer to write to the second bank of bitcells during a second write operation responsive to an assertion of a write enable signal for the second bank of bitcells.

In accordance with yet another aspect of the disclosure, a memory is provided that includes: a first bank of bitcells; a second bank of bitcells; and a shared write path configured to couple a write driver input signal to the first bank of bitcells responsive to an assertion of a write enable signal for the first bank of bitcells and to couple the write driver input signal to the second bank of bitcells responsive to an assertion of a write enable signal for the second bank of bitcells.

These and other advantageous features may be better appreciated through the following detailed description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figures.

DETAILED DESCRIPTION

An SRAM could be designed with all of its bitcells forming a single bank/array arranged into rows and columns. A corresponding word line traverses each row whereas a corresponding pair of bit lines traverses each column. But as the number of bitcells in the array increases, the row length and the column length increase accordingly. The resulting word lines and bit lines may then have too much capacitance such that the memory speed is degraded. The bitcells are thus typically arranged into banks. Each bank has its own rows and columns. A word line for one bank is not shared by another bank. In this fashion, the SRAM may include a relatively large number of bitcells without the word lines and bit lines becoming too long.

Although dividing the bitcells into banks is quite advantageous with respect to reducing the word line and bit line lengths, each bank then typically has its own supporting circuitry such as an input/output (I/O) circuit for the read and write paths to the bank's bitcells. A controller (often denoted as a global bank controller) controls the I/O circuit. In this fashion, parallel read or write operations may occur to the banks. The read and write operations are deemed to be parallel to each other because they each occur in the same memory clock cycle. To allow this simultaneous operation, each I/O circuit then typically needs its own corresponding die space on the semiconductor die for the integrated circuit in which the SRAM is embedded. To reduce the semiconductor die space occupied by the memory yet retain the speed advantages of individual (per bank) I/O circuits, an SRAM is disclosed in which the banks are arranged into pairs. For each pair of banks, a shared I/O circuit provides a shared read path and a shared write path controlled by a controller (which may also be denoted as a global bank controller).

The controller controls the shared read and write paths so that both may be active simultaneously for high-speed operation. As defined herein, a read operation and a write operation are deemed to be simultaneous when both the read operation and the write operation occur during the same memory clock cycle. The shared read and write paths to each pair of banks as controlled by a shared controller advantageously reduces the size (semiconductor die space) of the corresponding memory yet high-speed operation is maintained through the ability to simultaneously read to a first bank in a pair of banks while writing to a remaining second bank in the pair of banks.

Figure 1:
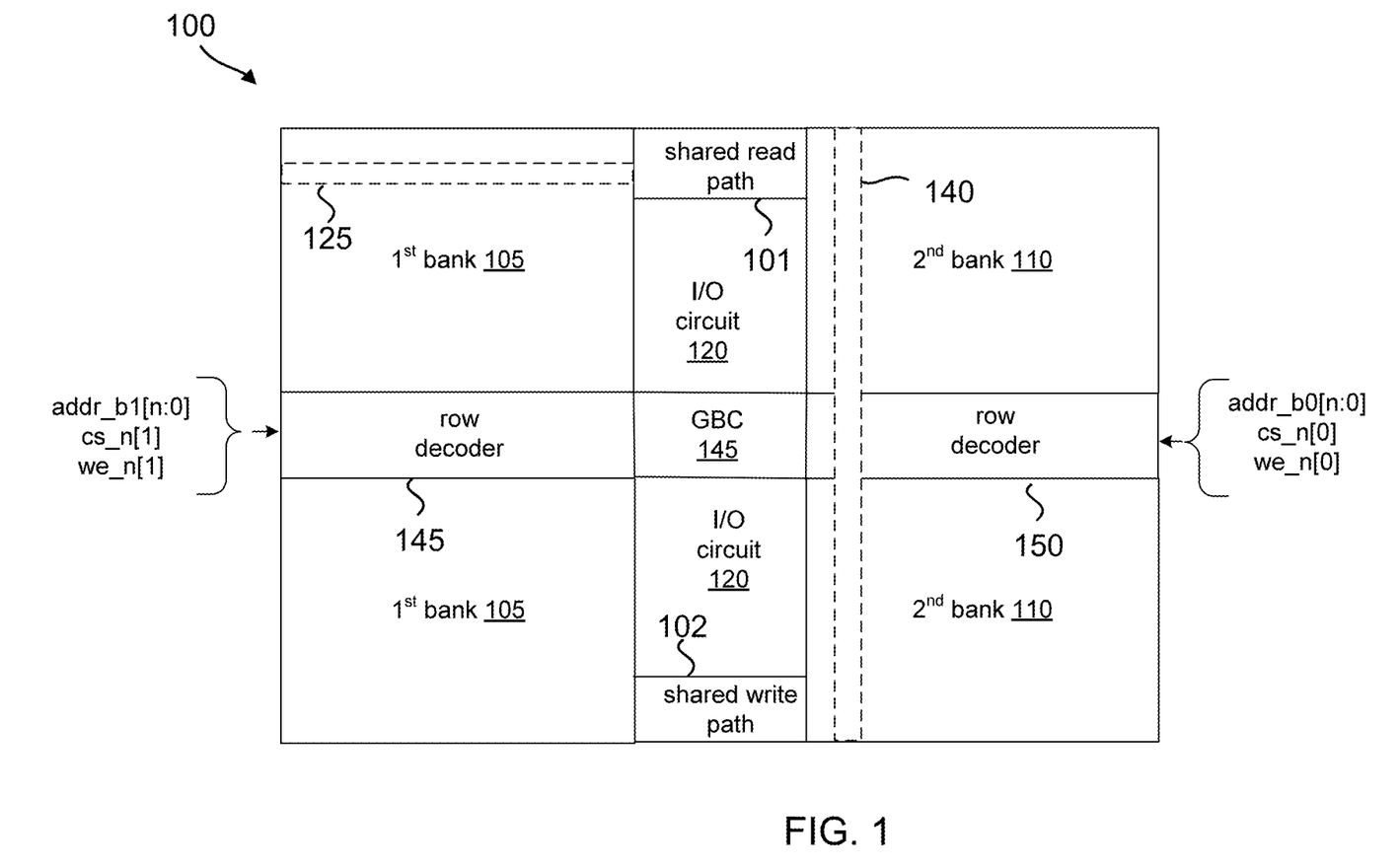
FIG. 1 illustrates an SRAM including a pair of banks accessed by a shared I/O circuit including a shared read path and a shared write path for the banks in accordance with an aspect of the disclosure.

An example SRAM 100 with a pair of banks 105 and 110 is shown in FIG. 1. An I/O circuit 120 includes a shared read path (discussed in more detail below) for reading from one of the banks while a shared write path (also discussed in more detail below) writes to the remaining one of the banks. Each bank 105 and 110 includes an array of bitcells arranged into rows and columns. An example column 125 of bitcells is shown in the first bank 105. Similarly, an example row 140 of bitcells is shown in the second bank 110. Each row of bitcells may store a plurality of interleaved words, each row having its own corresponding word line. There may then be corresponding columns for each word. For example, suppose each row of bitcells stores an even word and an odd word. Each bank 105 and 110 may then have corresponding even columns for the even words and odd columns for the odd words. More generally, if each row of bitcells stores a plurality of interleaved words of N bits each, each bank may include N columns for each interleaved word. Note, however, that the portion of the shared read path to read a single bit of a word from one of the banks will be analogous to the remaining portions of the shared read path for the remaining bits in the word. Similarly, the portion of the shared write path to write a single bit of a word to one of the banks will be analogous to the remaining portions of the shared write path for the remaining bits in the word.

Figure 2:
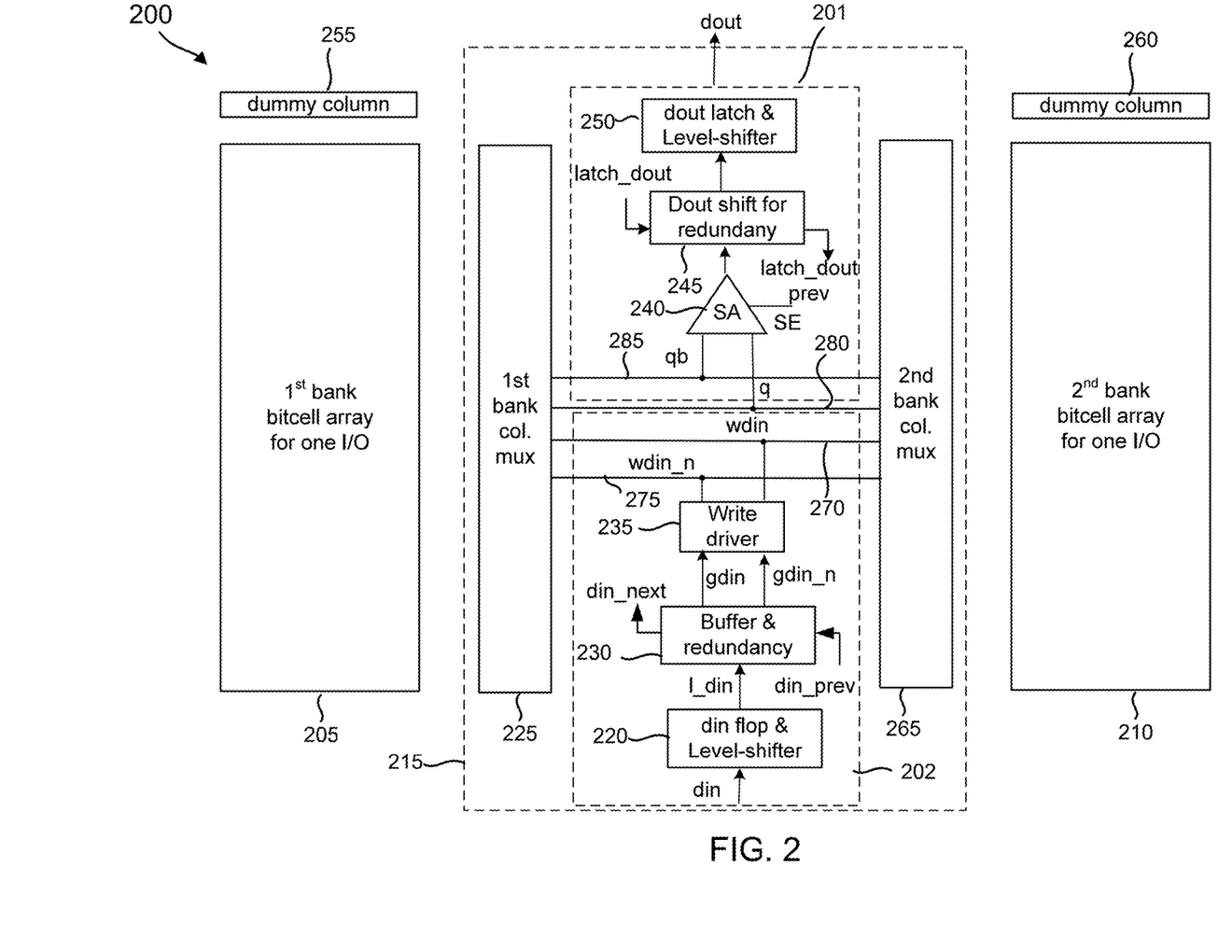
FIG. 2 illustrates a one-I/O portion of an SRAM in accordance with an aspect of the disclosure.

A one-bit I/O portion 200 of the SRAM 100 is thus shown in more detail in FIG. 2 since this I/O structure 200 will be analogous for all the remaining bits of a word. The I/O circuit 120 is represented by a one-bit I/O circuit 215 including a one-I/O shared read path 201 and a one-I/O shared write path 202 for banks 105 and 110 (FIG. 1). During a write operation to the first bank 105, a first bank column multiplexer (1$^{st}$ bank col. mux) 225 selects for the appropriate column depending upon which type of word is being written to the SRAM. Similarly, during a write operation to the second bank 110, a second bank column multiplexer 265 selects for the appropriate column. Although each column multiplexer 225 and 265 is illustrated as being generic to both the read and write paths it will be appreciated that separate read column multiplexers and write column multiplexers may be implemented. First bank column multiplexer 225 may thus be formed by a first bank read column multiplexer (not illustrated) and a first bank write column multiplexer (not illustrated). Similarly, second bank column multiplexer 265 may be formed by a second bank read column multiplexer (not illustrated) and a second bank write column multiplexer (not illustrated).

For illustration clarity, the one-I/O shared read path 201 and the one-I/O shared write path 202 in the one-I/O input circuit 215 are for just one input/output (I/O) bit each. For example, if there are just even and odd words with respect to the word interleaving, the first bank column multiplexer 225 would select from a pair of odd and even columns of bitcells. More generally, the first bank column multiplexer 225 may select from a plurality of columns corresponding to the plurality of words being interleaved. The columns being selected from to form a single output bit may be denoted as a first bank bitcell array 205 for one I/O. Suppose that the word size is 64 bits. The first bank 105 would thus have 64 first bank bitcell arrays 205 (each bitcell array 205 serving one I/O bit) and 64 corresponding first bank column multiplexers 225. More generally, if the word size is N bits (N being a plural positive integer), the first bank 105 may have N first bank bitcell arrays 205 for one I/O each and N corresponding first bank column multiplexers 225.

A second bank bitcell array 210 for one I/O from the second bank 110 is selected from analogously during a write operation to the second bank 110. The column multiplexers 225 and 265 also select for the appropriate column in their respective banks during a read operation. Due to this sharing of the read and write paths, the I/O circuit 120 may read from one of the banks while simultaneously writing to another one of the banks.

During a write operation to the first bank 105, the first bank column multiplexer 225 couples a write driver input signal wdin from a data input terminal 270 to a bit line (discussed further below) in the selected column in the first bank bitcell array 205. In addition, the first bank column multiplexer 225 couples a complement write driver input signal wdin_n from a complement data input terminal 275 to a complement bit line (also discussed further below) in the selected column in the first bank bitcell array 205 during the write operation. Note that the data input terminal 270 and the complement data input terminal 275 are both shared by the column multiplexers 225 and 265. Should the write operation instead be to the second bank 110, the second bank column multiplexer 265 couples the write driver input signal wdin from the data input terminal 270 to a bit line in the selected column in the second bank bitcell array 210 and couples the complement write driver input signal to a complement bit line in the selected column in the second bank bitcell array 210.

During a read operation to the first bank 105, the first bank column multiplexer 225 couples a data bit output signal (q) from the bit line in the selected column in the first bank bitcell array 205 for one I/O to a data bit output terminal 280 that is shared by the first bank column multiplexer 225 and the second bank multiplexer 265. The data bit output terminal 280 is also an input terminal for a sense amplifier 240 in the one-I/O shared read path 201. The first bank column multiplexer 225 also couples a complement data bit output signal (qb) during the read operation from the complement bit line in the selected column in the first bank bitcell array 205 for one I/O to a complement data bit output terminal 285 that is shared by the first bank column multiplexer 225 and the second bank column multiplexer 265. The complement data bit output terminal 285 also serves as a complement input terminal to the sense amplifier 240. The sense amplifier 240 may thus perform a bit decision responsive to the q and qb signals during the read operation to the first bank 105. Should the read operation instead be to the second bank 110, the second bank column multiplexer 265 couples the q signal from the bit line in the selected column in the second bank bitcell array 210 for one I/O to the data bit output terminal 280 and also couples the qb signal from the complement bit line in the selected column in the second bank bitcell array 210 to the complement data bit output terminal 285. The sense amplifier 240 may thus also perform a bit decision responsive to the q and qb signals during the read operation to the second bank 110.

Each column multiplexer 225 and 265 responds to a corresponding column address (not illustrated). Referring again to FIG. 1, the global bank controller 145 may control which bank is active for a read or write operation responsive to a pair of active-low chip select signals cs_n[1] and cs_n[0]. Should the chip select signal cs_n[1] be asserted, then the first bank 105 is active for a read or write operation. Similarly, the second bank 110 is selected for a read or write operation responsive to an assertion of the chip select signal cs_n[0]. As defined herein, a binary signal is deemed to be asserted when the signal has a binary true value, regardless of whether an active-high or an active-low convention is used. An active-high signal is thus asserted by being charged to the memory power supply voltage and de-asserted by being discharged to ground. But an active-low signal is asserted by being discharged to ground and de-asserted by being charged to the memory power supply voltage. It will be appreciated that active-high chip select signals may be used in alternative implementations.

With a bank selected by the assertion of its chip-select signal, whether the bank is active for a write or read operation may be controlled by a corresponding write enable signal. For example, an active-low write enable signal we_n[1] may control whether the first bank 105 is active for a write or read operation. Similarly, an active-low write enable signal we_n[0] may control whether the second bank 110 is active for a write or read operation. Should the write enable signal we_n[1] be asserted in conjunction with the chip select signal cs_n[1], then the first bank 105 is active for a write operation. Conversely, if the write enable signal we_n[1] is de-asserted while the chip select signal cs_n[1] is asserted, then the first bank 105 is active for a read operation. Similarly, the second bank 110 is active for a write operation responsive to an assertion of the write enable signal we_n[0] and the chip select signal cs_n[0]. Conversely, the second bank 110 is active for a read operation responsive to a de-assertion of the write enable signal we_n[0] while the chip select signal cs_n[0] is asserted. It will be appreciated that an active-high convention for the write enable signals could also be used in alternative implementations.

Referring again to FIG. 2, the first bank column multiplexer 225 couples the write driver input signals wdin and wdin_n to the selected column in the first bank bitcell array 205 when the first bank 105 is selected for a write operation. Conversely, if the write enable signal we_n[1] is not asserted while the first bank chip select signal cs_n[1] is asserted, the first bank column multiplexer 225 couples the q and qb signals from the selected column to the sense amplifier 240. The second bank column multiplexer 265 is configured for a write operation or for a read operation analogously as discussed for first bank column multiplexer 225.

Although the column multiplexers 225 and 265 are shown separately from the shared write path 202, it will be appreciated that the column multiplexer for the write-enabled one of the banks may be deemed to be part of the shared write path 202 in some implementations. The shared write path 202 may thus be deemed to be configured to couple a write driver input signal wdin to the first bank of bitcells 105 when the first bank of bitcells 105 is selected for a write operation by the assertion of the write enable signal we_n[1] and the chip select signal cs_n[1] and to couple the write driver input signal wdin to the second bank of bitcells 110 in response to the assertion of the write enable signal we_n[0] and the chip select signal cs_n[0]. Similarly, the column multiplexer for the read-enabled one of the banks may be deemed to be part of the shared read path 201 in some implementations. The shared read path 201 may thus be configured to couple a data bit output signal q from a selected column in the first bank of bitcells 105 to the sense amplifier 240 responsive to a de-assertion of the we_n[1] signal in conjunction with an assertion of the chip select signal cs_n[1] and to couple a data bit output signal q from a selected column in the second bank of bitcells 110 to the sense amplifier 240 responsive to a de-assertion of the we_n[0] signal in conjunction with an assertion of the chip select signal cs_n[0].

As noted earlier, the one-I/O shared write path 202 produces only the wdin and wdin_n signals for the selected column during a write operation. This is just one bit in a digital word being written to SRAM 100. A shared write path 101 in the I/O circuit 120 thus produces the wdin and wdin_n signals for each bit in the word being written to the accessed bank. Similarly, the one-I/O shared read path 201 receives just the q and qb signals from the selected column during a read operation. A shared read path 101 in the I/O circuit 120 receives the q and qb signals for each bit in the digital word being read and would thus include a one-I/O shared read path 201 for each bit. The one-I/O shared write path 202 will now be discussed in more detail, followed by a discussion of the one-I/O shared read path 201.

The one-I/O shared write path 201 includes a data input memory element (e.g. a flip-flop) and level-shifter 220 for level shifting and latching an input data signal (din). In that regard, the input data signal may be generated in a core power domain (not illustrated) that is powered by a core power supply voltage that may not be equal to a memory power supply voltage for the SRAM 100. Level-shifter 220 thus level shifts the input data signal from the core power domain to the memory power domain to form a level-shifted data input signal (l_din). The level-shifted data input signal passes through a buffer and redundancy circuit 230. Should there be a defective column in the bank being written to, the buffer and redundancy circuit 230 may receive a data input signal (din_prev) from a previous one of the columns in the bank being written to so that this din_prev signal may drive the one-bit shared write path 201. In that case, the level-shifted data input signal passes to a subsequent column in the bank as a data input signal (din_next). Assuming there is no defective column, the buffer and redundancy circuit 230 passes the level-shifted data input signal as a buffered data input signal (gdin) and also a complement of the buffered data input signal (gdin_n) to a write driver 235. The write driver 235 responds to the buffered data input signal gdin by driving it as the write driver data input signal wdin to the column multiplexer for the appropriate bank. Similarly, the write driver 235 responds to the complement of the buffered data input signal gdin_n by driving it as the complement write driver input signal wdin_n to same column multiplexer.

The one-I/O shared read path 201 begins with the q and qb signals being sensed by the sense amplifier 240 responsive to an assertion of a sense enable (SE) signal to produce a sense amplifier output signal, which may also be denoted as a bit decision signal. Depending upon whether there is a defective column in the bank being accessed during the read operation, a data output redundancy shift circuit 245 may shift out the shift amplifier output signal as a latch_dout_prev signal to a subsequent column's data output redundancy shift circuit (not illustrated). Similarly, the data output redundancy shift circuit 245 may shift in the sense amplifier output signal from a preceding column should there be a defective column in the accessed bank. Assuming that there is no defective column, the data output redundancy shift circuit 245 may pass the sense amplifier output signal to a data output (dout) latch and level-shifter circuit 250. A latched data output signal from the data output latch and level-shifter circuit 250 is thus level-shifted from the memory power domain to the core power domain.

Figure 3:
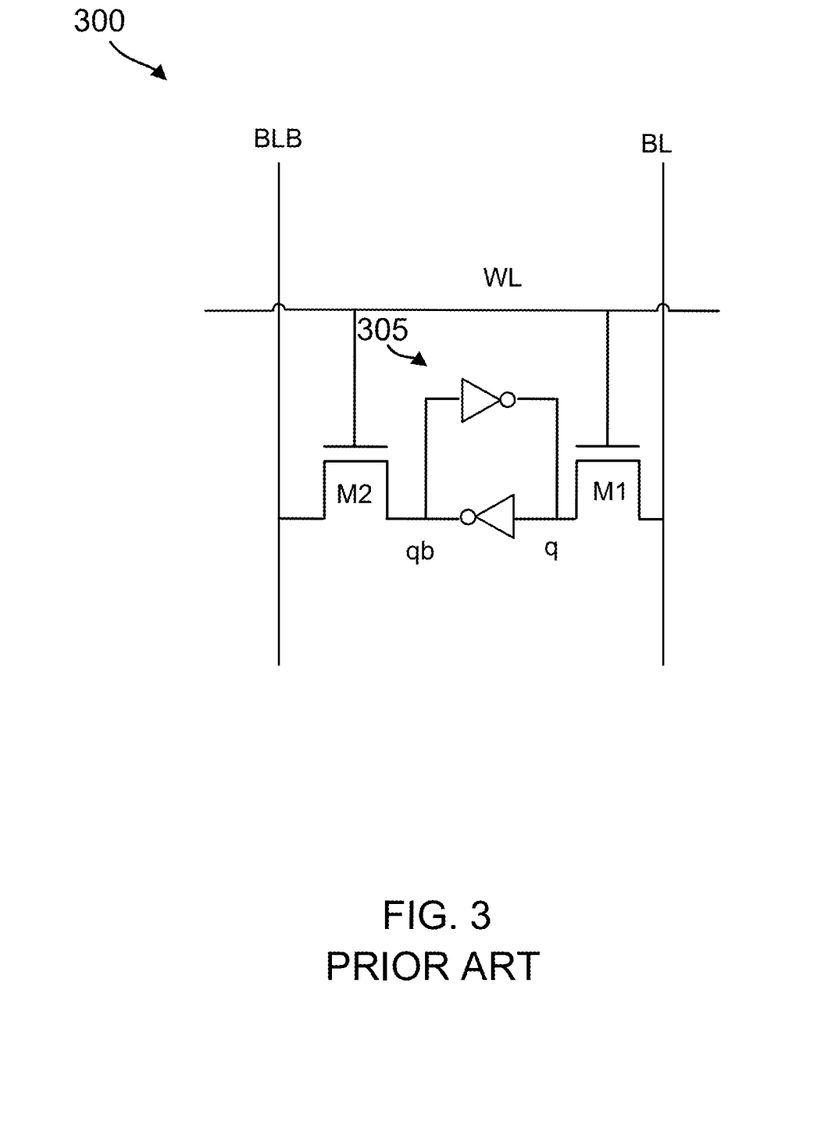
FIG. 3 illustrates an example bitcell for an SRAM in accordance with an aspect of the disclosure.

An example bitcell 300 for the SRAM 100 is shown in FIG. 3. Bitcell 300 is part of a column of bitcells (e.g., column 125) that is traversed by a bit line BL and a complement bit line BLB. In addition, bitcell 300 is part of a row of bitcells (for example, row 140) that is traversed by a word line WL. Bitcell 300 latches a bit using a pair 305 of cross-coupled inverters. An output terminal of a first one of the cross-coupled inverters forms the q signal that will be sensed during a read operation. During a read operation, a controller that may also be denoted as a global bank controller (GBC) 145 (FIG. 1) asserts the word line voltage to switch on an access transistor M1 that couples between the node for the q signal and the bit line BL. Similarly, the controller 145 asserts the word line voltage during a write operation so that write driver input signal wdin (FIG. 2) driving the bit line BL may cause the q signal to have the desired binary value. An output terminal of a second one of the cross-coupled inverters forms the qb signal that will also be sensed during a read operation. During a read operation, the asserted word line voltage switches on an access transistor M2 that couples between the node for the qb signal and the complement bit line BL. Similarly, the controller 145 asserts the word line voltage during a write operation so that the complement write driver input signal wdin_n driving the complement bit line BLB may cause the qb signal to have the desired binary value. Each inverter in the pair 305 of the cross-coupled inverters is formed by two transistors (not illustrated). Bitcell 300 is thus a six transistor (6T) bitcell but it will be appreciated that the simultaneous read and write operations as disclosed herein to a pair of banks through shared read and write paths may be practiced by SRAMs with bitcells using more than six transistors. For example, a dual-port SRAM in which each bitcell is an eight transistor (8T) bitcell may advantageously use the shared read and write paths of the present disclosure.

Referring again to FIG. 1, the controller 145 controls the timing of the read and write operations. For example, the controller 145 may assert the sense enable signal SE after a sufficient voltage difference has developed on the bit line pair for a selected column during a read operation and also release the word line voltage at the same time. To determine when a sufficient voltage difference has developed on the bit line pair during a write operation, the controller 145 may sense a dummy bit line voltage for a replica write column 225 (FIG. 2). The controller 145 may then release the word line voltage assertion during the write operation once the bit line pair for the selected column has developed a sufficient voltage difference for a successful write to the accessed bitcell. To determine when a sufficient voltage difference has developed on the bit line pair during a read operation, the controller 145 may sense a dummy bit line voltage for a replica read column 260 (FIG. 2).

A row decoder 145 for the first bank 105 decodes an (n+1) bit wide row address addr_b1[n:0] to select a word line to be asserted during a read or write operation for the first bank 105 should the first bank chip select signal cs_n[1] be asserted, where n is a plural positive integer. Similarly, a row decoder 150 for the second bank 110 decodes a row address addr_b0[n:0] to select a word line to be asserted during a read or write operation for the second bank 110 should the second bank chip select signal cs_n[0] be asserted.

Figure 4:
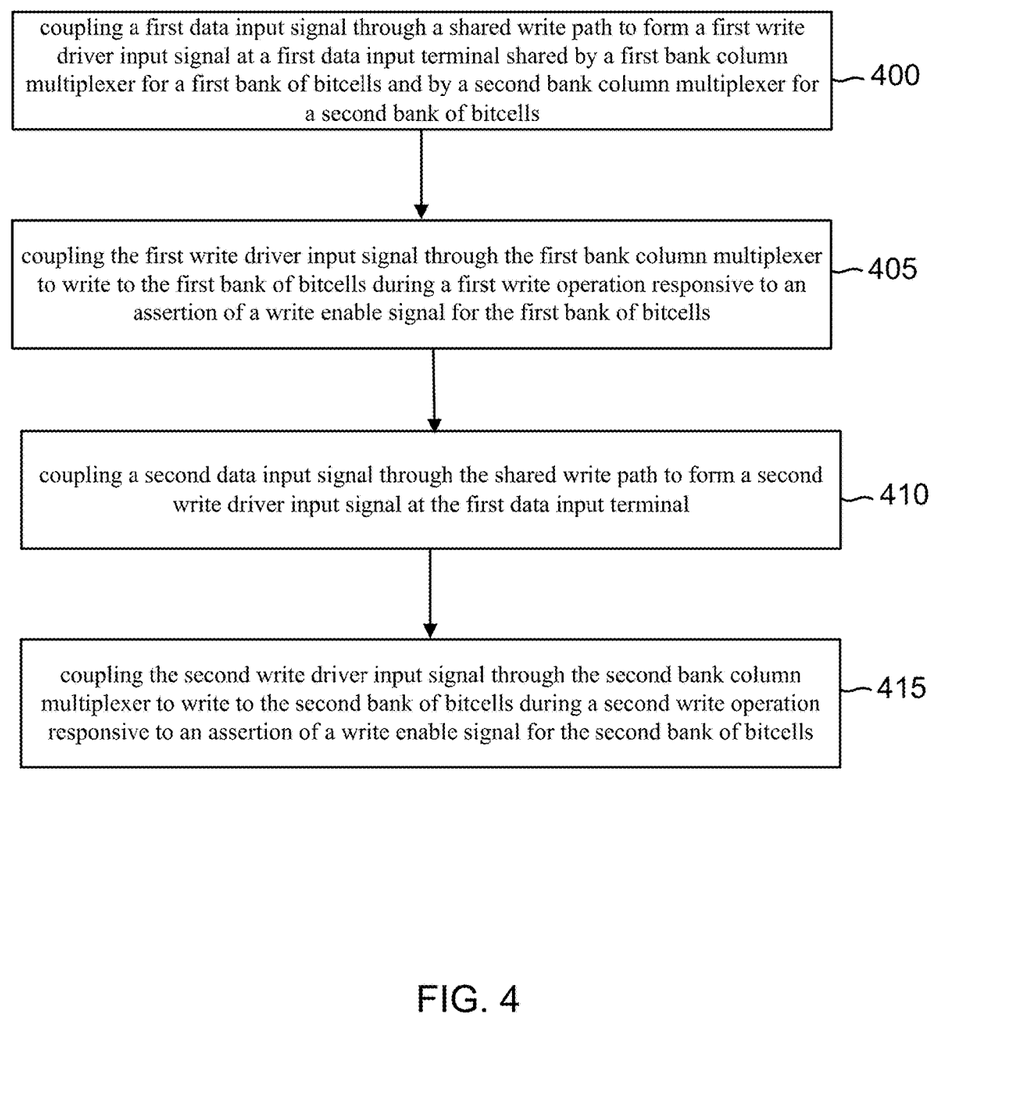
FIG. 4 is a flowchart for a method of operation for a memory in which two banks share a write path in accordance with an aspect of the disclosure.

A method of operation for a memory including a shared write path in accordance with the disclosure will now be discussed with regard to the flowchart of FIG. 4. The method includes an act 400 of coupling a first data input signal through a shared write path to form a first write driver input signal at a first data input terminal shared by a first bank column multiplexer for a first bank of bitcells and shared by a second bank column multiplexer for a second bank of bitcells. The coupling of a data input signal through the shared write path 202 to form the write driver input signal wdin at the data input terminal 270 is an example of act 400.

In addition, the method includes an act 405 of coupling the first write driver input signal through the first bank column multiplexer to write to the first bank of bitcells during a first write operation responsive to an assertion of a write enable signal for the first bank of bitcells. The coupling of the write driver input signal wdin through the first bank column multiplexer 225 to a selected column in the first bank of bitcells 105 during a write operation to the first bank of bitcells 105 responsive to the assertion of the write enable signal we_n[1] is an example of act 405.

The method also includes an act 410 of coupling a second data input signal through the shared write path to form a second write driver input signal at the first data input terminal. The coupling of data input signal through the shared write path 102 to form the write driver input signal wdin at the data input terminal 270 during a write operation to the second bank of bitcells 110 responsive to the assertion of the write enable signal we_n[0] is an example of act 410.

Finally, the method includes an act 415 of coupling the second write driver input signal through the second bank column multiplexer to write to the second bank of bitcells during a second write operation responsive to an assertion of a write enable signal for the second bank of bitcells. The coupling of the write driver input signal wdin through the second bank column multiplexer 265 to a selected column in the second bank of bitcells 110 during a write operation to the second bank of bitcells 110 is an example of act 415.

Figure 5:
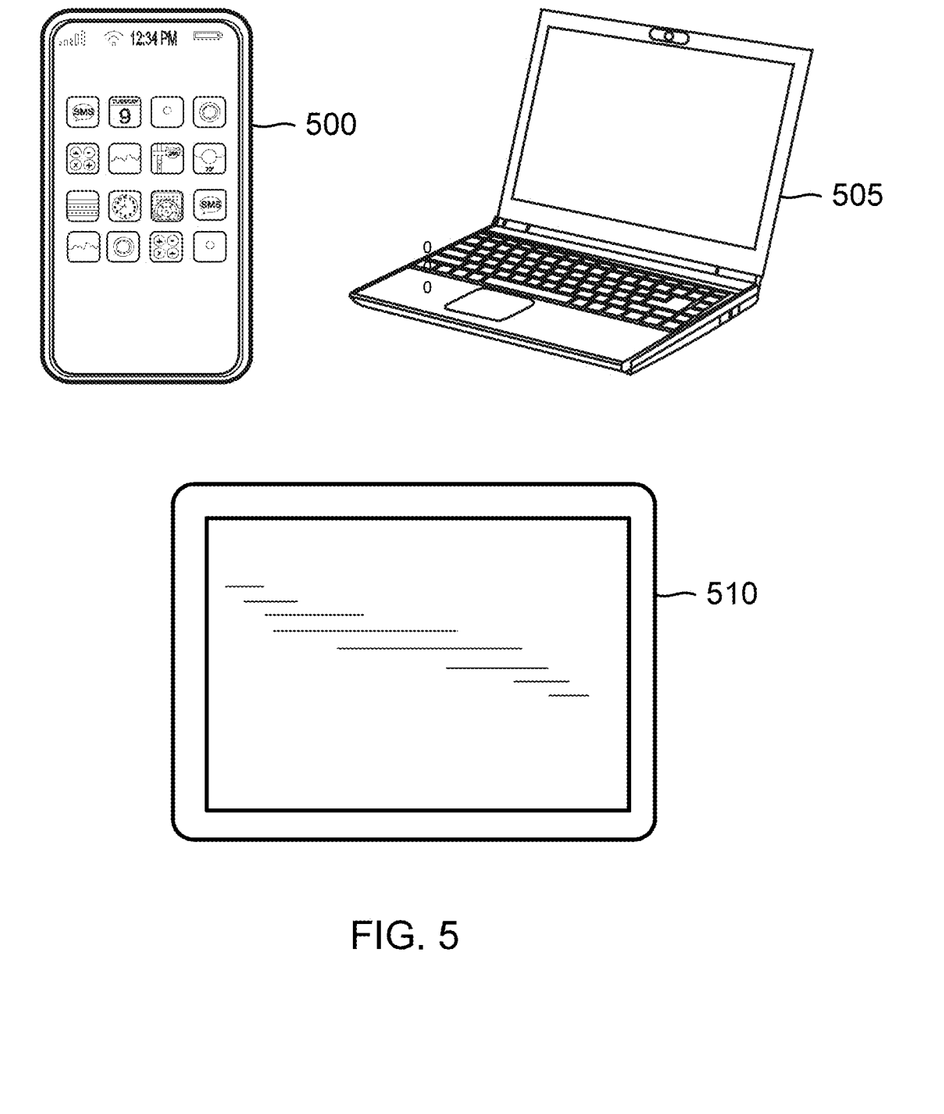
FIG. 5 illustrates some example electronic systems including an integrated circuit having a memory with a pair of banks and a shared I/O circuit in accordance with an aspect of the disclosure.

An integrated circuit including a memory having an I/O circuit as disclosed herein may be advantageously employed in a wide variety of electronic systems. For example, as shown in FIG. 5, a cellular telephone 500, a laptop computer 505, and a tablet PC 510 may all include an integrated circuit having a memory in accordance with the disclosure. Other exemplary electronic systems such as a music player, a video player, a communication device, and a personal computer may also be configured with an integrated circuit having a memory constructed in accordance with the disclosure.

The disclosure will now be summarized in the following series of clauses:

Clause 1. A memory comprising:

a first bank of bitcells arranged into rows and columns;

a first bank column multiplexer configured to select a column from the first bank of bitcells;

a second bank of bitcells arranged into rows and columns;

a second bank column multiplexer configured to select a column from the second bank of bitcells; and an input/output circuit including a shared read path coupled to the first bank column multiplexer and to the second bank column multiplexer and including a shared write path coupled to the first bank column multiplexer and to the second bank column multiplexer.

Clause 2. The memory of clause 1, further comprising:

a controller configured to control a timing of a first read operation to the first bank of bitcells through the shared read path and to control a timing of a first write operation to the second bank of bitcells through the shared write path, wherein the first read operation is simultaneous with the first write operation.

Clause 3. The memory of clause 2, wherein the controller is further configured to control a timing of a second read operation to the second bank of bitcells through the shared read path and to control a timing of a second write operation to the first bank of bitcells through the shared write path, wherein the second read operation is simultaneous with the second write operation.

Clause 4. The memory of any of clauses 2-3, further comprising:

a first replica column; and a second replica column; wherein the controller is coupled to the first replica column and to the second replica column.

Clause 5. The memory of any of clauses 2-4, wherein the shared read path includes:
 a sense amplifier, and wherein the controller is further configured to assert a sense enable signal to the sense amplifier.

Clause 6. The memory of any of clauses 1-5, wherein the shared write path includes a write driver, and wherein a data input terminal shared by the first bank column multiplexer and by the second bank column multiplexer is coupled to the write driver, and wherein a complement data input terminal shared by the first bank column multiplexer and by the second bank multiplexer is also coupled to the write driver.

Clause 7. The memory of any of clauses 1-6, wherein each column in the first bank of bitcells includes a corresponding pair of bit lines, and wherein the first bank column multiplexer is coupled to a bit line in the corresponding pair of bit lines for the selected column in the first bank of bitcells and is coupled to a complement bit line in the corresponding pair of bit lines.

Clause 8. The memory of clause 6, wherein the shared write path further includes:
 a level-shifter configured to level-shift a data input signal responsive to a memory power supply voltage for the memory to form a level-shifted data input signal.

Clause 9. The memory of clause 8, wherein the shared write path further includes:
 a buffer configured to buffer the level-shifted data input signal to form a buffered data input signal and a complement buffered data input signal.

Clause 10. The memory of clause 9, wherein the shared write path further includes:
 a write driver configured to drive the data input terminal with a write driver input signal responsive to the buffered data input signal to drive the complement data input terminal with a complement write driver input signal responsive to the complement buffered data input signal.

Clause 11. The memory of clause 5, wherein the sense amplifier includes an input terminal coupled to a data bit output terminal shared by the first bank column multiplexer and by the second bank column multiplexer and includes a complement input terminal coupled to a complement data bit output terminal shared by the first bank column multiplexer and by the second bank column multiplexer.

Clause 12. The memory of clause 11, wherein the shared read path further includes a data output latch and level-shifter configured to level-shift a data output signal from the sense amplifier to form a level-shifted data output signal and to latch the level-shifted data output signal to form a data output signal for the shared read path.

Clause 13. The memory of any of clauses 1-12, wherein each bitcell in the first bank of bitcells and in the second bank of bitcells is a six-transistor bitcell.

Clause 14. The memory of any of clauses 1-13, wherein the memory is integrated into a cellular telephone.

Clause 15. A method of operation for a memory, comprising:
 coupling a first data input signal through a shared write path to form a first write driver input signal at a data input terminal shared by a first bank column multiplexer for a first bank of bitcells and by a second bank column multiplexer for a second bank of bitcells;
 coupling the first write driver input signal through the first bank column multiplexer to write to the first bank of bitcells during a first write operation responsive to an assertion of a write enable signal for the first bank of bitcells;
 coupling a second data input signal through the shared write path to form a second write driver input signal at the data input terminal; and
 coupling the second write driver input signal through the second bank column multiplexer to write to the second bank of bitcells during a second write operation responsive to an assertion of a write enable signal for the second bank of bitcells.

Clause 16. The method of clause 15, further comprising:
 coupling a first data bit output signal from the second bank of bitcells through the second bank column multiplexer to a data bit output terminal shared by the first bank column multiplexer and by the second bank column multiplexer during a first read operation responsive to a de-assertion of the write enable signal for the second bank of bitcells; and
 coupling the first data bit output signal from the data bit output terminal to a sense amplifier in a shared read path during the first read operation, wherein the first write operation is simultaneous with the first read operation.

Clause 17. The method of clause 16, further comprising:
 coupling a second data bit output signal from the first bank of bitcells through the first bank column multiplexer to the data bit output terminal during a second read operation responsive to a de-assertion of the write enable signal for the first bank of bitcells; and
 coupling the second data bit output signal from the data bit output terminal to the sense amplifier during the second read operation, wherein the second write operation is simultaneous with the second read operation.

Clause 18. The method of clause 15, further comprising:
 coupling a first complement data input signal through the shared write path to form a first complement write driver input signal at a first complement data input terminal shared by the first bank column multiplexer and by the second bank column multiplexer during the first write operation; and
 coupling the first complement write driver input signal through the first bank column multiplexer to the first bank of bitcells during the first write operation.

Clause 19. The method of clause 16, further comprising:
 coupling a first complement data bit output signal during the first read operation from the second bank of bitcells through the second bank column multiplexer to a complement data output terminal shared by the first bank column multiplexer and by the second bank column multiplexer; and
 coupling the first complement data bit output signal from the complement data output terminal to the sense amplifier during the first read operation.

Clause 20. A memory comprising:
 a first bank of bitcells;
 a second bank of bitcells; and
 a shared write path configured to couple a write driver input signal to the first bank of bitcells responsive to an assertion of a write enable signal for the first bank of bitcells and to couple the write driver input signal to the second bank of bitcells responsive to an assertion of a write enable signal for the second bank of bitcells.

Clause 21. The memory of clause 20, further comprising:
 a shared read path configured to couple a data bit signal from the first bank of bitcells to a sense amplifier responsive to a de-assertion of the write enable signal for the first bank of bitcells and to couple a data bit signal from the second bank of bitcells to the sense amplifier responsive to a de-assertion of the write enable signal for the second bank of bitcells.

Clause 22. The memory of clause 21, further comprising:
a controller configured to control a timing of a sense enable signal to the sense amplifier.

Clause 23. The memory of clause 20, wherein each bitcell in the first bank of bitcells and in the second bank of bitcells is a six-transistor bitcell.

Clause 24. The memory of any of clauses 20-23, wherein the memory is a static random-access memory.

Clause 25. The memory of clause 21, wherein the shared read path includes a data output latch configured to latch a bit decision signal from the sense amplifier to form a data output signal.

Clause 26. The memory of clause 25, wherein the data output latch further comprises a level-shifter configured to level-shift the data output signal.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

We claim:

1. A memory comprising:
a first bank of bitcells arranged into rows and columns;
a first bank column multiplexer configured to select a column from the first bank of bitcells;
a second bank of bitcells arranged into rows and columns;
a second bank column multiplexer configured to select a column from the second bank of bitcells;
an input/output circuit including a shared read path coupled to the first bank column multiplexer and to the second bank column multiplexer and including a shared write path coupled to the first bank column multiplexer and to the second bank column multiplexer; and
a controller configured to control a timing of a first read operation to the first bank of bitcells through the shared read path and to control a timing of a first write operation to the second bank of bitcells through the shared write path, wherein the first read operation is simultaneous with the first write operation.

2. The memory of claim 1, wherein the controller is further configured to control a timing of a second read operation to the second bank of bitcells through the shared read path and to control a timing of a second write operation to the first bank of bitcells through the shared write path, wherein the second read operation is simultaneous with the second write operation.

3. The memory of claim 1, further comprising:
a first replica column; and
a second replica column; wherein the controller is coupled to the first replica column and to the second replica column.

4. The memory of claim 1, wherein the shared read path includes:
a sense amplifier, and wherein the controller is further configured to assert a sense enable signal to the sense amplifier.

5. The memory of claim 4, wherein the sense amplifier includes an input terminal coupled to a data bit output terminal shared by the first bank column multiplexer and by the second bank column multiplexer and includes a complement input terminal coupled to a complement data bit output terminal shared by the first bank column multiplexer and by the second bank column multiplexer.

6. The memory of claim 5, wherein the shared read path further includes a data output latch and level-shifter configured to level-shift a data output signal from the sense amplifier to form a level-shifted data output signal and to latch the level-shifted data output signal to form a data output signal for the shared read path.

7. The memory of claim 1, wherein the shared write path includes a write driver, and wherein a data input terminal shared by the first bank column multiplexer and by the second bank column multiplexer is coupled to the write driver, and wherein a complement data input terminal shared by the first bank column multiplexer and by the second bank multiplexer is also coupled to the write driver.

8. The memory of claim 7, wherein the shared write path further includes:
a level-shifter configured to level-shift a data input signal responsive to a memory power supply voltage for the memory to form a level-shifted data input signal.

9. The memory of claim 8, wherein the shared write path further includes:
a buffer configured to buffer the level-shifted data input signal to form a buffered data input signal and a complement buffered data input signal.

10. The memory of claim 9, wherein the shared write path further includes:
a write driver configured to drive the data input terminal with a write driver input signal responsive to the buffered data input signal to drive the complement data input terminal with a complement write driver input signal responsive to the complement buffered data input signal.

11. The memory of claim 1, wherein each bitcell in the first bank of bitcells and in the second bank of bitcells is a six-transistor bitcell.

12. The memory of claim 1, wherein the memory is integrated into a cellular telephone.

13. The memory of claim 1, wherein each column in the first bank of bitcells includes a corresponding pair of bit lines, and wherein the first bank column multiplexer is coupled to a bit line in the corresponding pair of bit lines for the selected column in the first bank of bitcells and is coupled to a complement bit line in the corresponding pair of bit lines.

14. A method of operation for a memory, comprising:
coupling a first data input signal through a shared write path to form a first write driver input signal at a data input terminal shared by a first bank column multiplexer for a first bank of bitcells and by a second bank column multiplexer for a second bank of bitcells;
coupling the first write driver input signal through the first bank column multiplexer to write to the first bank of bitcells during a first write operation responsive to an assertion of a write enable signal for the first bank of bitcells;
coupling a second data input signal through the shared write path to form a second write driver input signal at the data input terminal; and
coupling the second write driver input signal through the second bank column multiplexer to write to the second bank of bitcells during a second write operation responsive to an assertion of a write enable signal for the second bank of bitcells.

15. The method of claim 14, further comprising:
coupling a first data bit output signal from the second bank of bitcells through the second bank column multiplexer to a data bit output terminal shared by the first bank column multiplexer and by the second bank column multiplexer during a first read operation responsive to a de-assertion of the write enable signal for the second bank of bitcells; and
coupling the first data bit output signal from the data bit output terminal to a sense amplifier in a shared read path during the first read operation, wherein the first write operation is simultaneous with the first read operation.

16. The method of claim 14, further comprising:
coupling a first complement data input signal through the shared write path to form a first complement write driver input signal at a first complement data input terminal shared by the first bank column multiplexer and by the second bank column multiplexer during the first write operation; and
coupling the first complement write driver input signal through the first bank column multiplexer to the first bank of bitcells during the first write operation.

17. The method of claim 15, further comprising:
coupling a second data bit output signal from the first bank of bitcells through the first bank column multiplexer to the data bit output terminal during a second read operation responsive to a de-assertion of the write enable signal for the first bank of bitcells; and
coupling the second data bit output signal from the data bit output terminal to the sense amplifier during the second read operation, wherein the second write operation is simultaneous with the second read operation.

18. The method of claim 15, further comprising:
coupling a first complement data bit output signal during the first read operation from the second bank of bitcells through the second bank column multiplexer to a complement data output terminal shared by the first bank column multiplexer and by the second bank column multiplexer; and
coupling the first complement data bit output signal from the complement data output terminal to the sense amplifier during the first read operation.

19. A memory comprising:
a first bank of bitcells;
a second bank of bitcells;
a shared write path configured to couple a write driver input signal to the first bank of bitcells responsive to an assertion of a write enable signal for the first bank of bitcells and to couple the write driver input signal to the second bank of bitcells responsive to an assertion of a write enable signal for the second bank of bitcells;
a controller coupled to the shared write path and a shared read path, the controller configured to control a timing of a sense enable signal to a sense amplifier, wherein the sense amplifier is coupled to the share read path.

20. The memory of claim 19, wherein,
the shared read path is configured to couple a data bit signal from the first bank of bitcells to the sense amplifier responsive to a de-assertion of the write enable signal for the first bank of bitcells and to couple a data bit signal from the second bank of bitcells to the sense amplifier responsive to a de-assertion of the write enable signal for the second bank of bitcells.

21. The memory of claim 19, wherein each bitcell in the first bank of bitcells and in the second bank of bitcells is a six-transistor bitcell.

22. The memory of claim 19, wherein the memory is a static random-access memory.

23. The memory of claim 20, wherein the shared read path includes a data output latch configured to latch a bit decision signal from the sense amplifier to form a data output signal.

24. The memory of claim 23, wherein the data output latch further comprises a level-shifter configured to level-shift the data output signal.

* * * * *